July 21, 1931.  F. S. BOLTZ  1,815,542

CATCH BASIN FOR SOIL WATER HEAT RECLAIMERS

Original Filed Feb. 17, 1926

Inventor
Fred S. Boltz
By Macleod, Calver, Copeland & Dike
Attorneys.

Patented July 21, 1931

1,815,542

UNITED STATES PATENT OFFICE

FRED S. BOLTZ, OF MANSFIELD, MASSACHUSETTS

CATCH BASIN FOR SOIL WATER HEAT RECLAIMERS

Original application filed February 17, 1926, Serial No. 88,908. Divided and this application filed February 23, 1928. Serial No. 256,127.

The invention has special reference to catch basins for waste water and is more especially intended for application to catch basins for waste water which has performed its function in a laundry, dye house, wool scouring plant or elsewhere and which is still hot when it is discharged into the catch basin. It is further especially intended for application to catch basins having in connection therewith apparatus for reclaiming and transferring the heat from the hot soil water to clean cold fresh water and thus utilizing the heat of the soil waste water to heat the fresh supply of clean water. The invention however is not limited to use in connection with heat reclaiming apparatus but is applicable in the construction of any catch basin. This application is a division of an application filed by me February 17, 1926, now Patent No. 1,689,993, dated October 30, 1928.

In use in connection with a heat reclaimer or heat extractor the floor space available is nearly always limited and working conditions frequently require that the installation shall be made in a minimum of time. It is also desirable that the installation of the catch basin be possible for the most part by workmen who are not highly skilled thereby reducing the expense.

One object of the present invention is to provide a catch basin built up of tubular metallic sections in such manner that after a pit for the catch basin has been partially dug in the ground one section can be inserted to prevent the earth from caving in and the pit can then be dug still deeper and a second section of smaller diameter be lowered through the first section and joined to the first section.

In the installation of waste water heat extractors, floor space or an installation space is almost always at a premium. As the heat extractor is usually cylindrical because that is the most practical form, and is usually set in vertical position, it is desirable that the catch basin shall be of such shape that the heat extractor may be installed in one side portion of the catch basin and be of such size and contour that the heat extractor and necessary pipes will fit therein without unnecessary waste of space and that the remaining portion of the basin have free, unobstructed space for the soil water. One feature of the invention consists in making the catch basin of elliptical contour so as to make it especially adapted for use with a cylindrical heat extractor positioned at one end of the ellipse and to provide sufficient room for installation of the necessary piping and other apparatus within the catch basin for carrying off the cooled waste water to a place of discharge and for carrying off the fresh water after being heated by the hot soil water to the proper place where the fresh water thus heated is to be used and also to provide ample unobstructed space for the soil water.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

Figure 1:
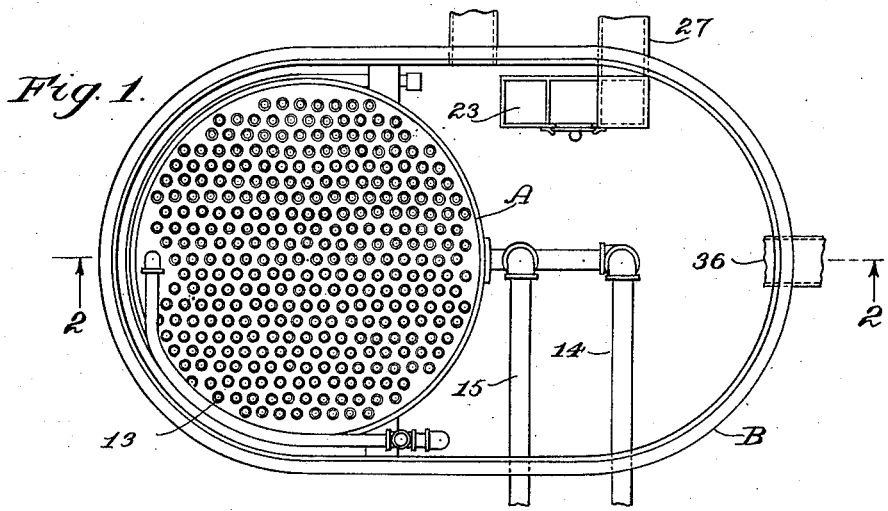
Fig. 1 is a plan view of one form of apparatus embodying the invention with the cover of the catch basin removed.
Figure 2:
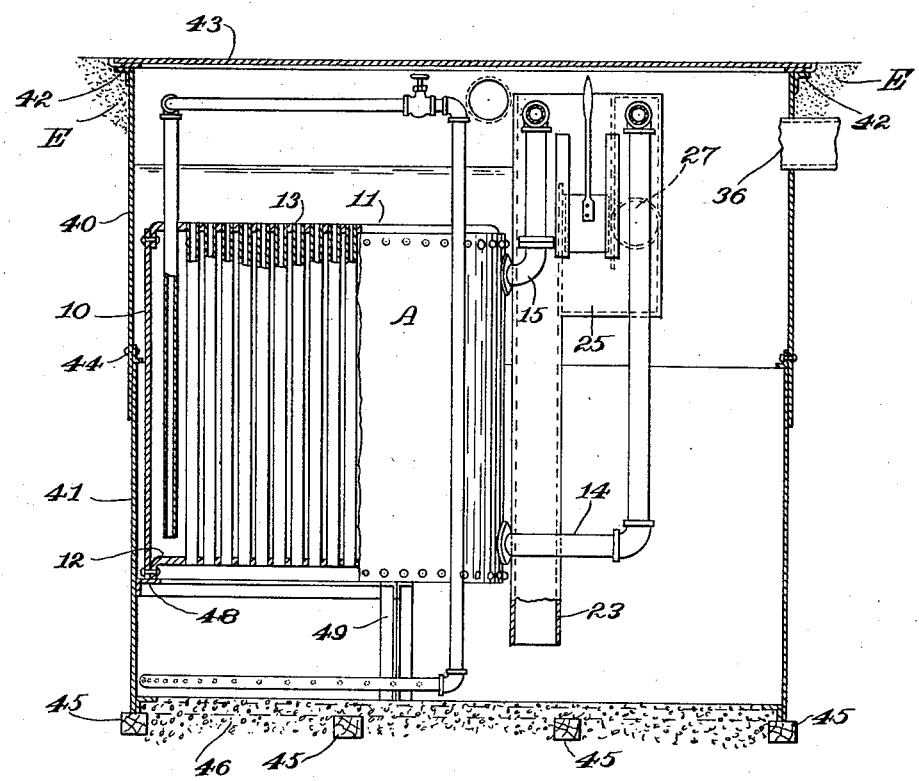
Fig. 2 is a vertical section taken on line 2—2 of Fig. 1.

Referring to the drawings there is shown at B a catch basin embodying the invention and having a heat reclaimer mounted in the catch basin. The catch basin B is preferably oval or elliptical in plan view. The heat reclaimer A is cylindrical and of a diameter to fit in one end portion of the oval catch basin. The catch basin is made of metal and in tubular sections set successively one within the other, the larger section being at the top and the lower section being set upon a suitable base.

In the drawings the catch basin is shown as composed of only two sections 40, 41 set into a pit in the earth as shown at E.

The top section 40 is provided with an annular outwardly extending flange 42 to enable it to be secured to the floor or other suitable support. It is provided with a cover 43.

The lower section 41, which as well as the upper section 40, is oval in shape, is preferably concentric with the upper section 40 and of slightly less diameter than the upper section so that it may be lowered into place through the upper section without disturbing the upper section. The purpose of this is to permit the upper section to be installed as soon as the pit in the ground has been dug deep enough to allow the upper section to be inserted and to allow it to remain in place while the pit is further deepened to receive the other section 41 which may be lowered down through the upper section in telescopic fashion. Frequently when a hole is dug for the catch basin loose or caving earth is encountered and if it were attempted to dig the pit deep enough for the entire basin before any part of the metallic basin is inserted the earth would be continually caving in and it would be very difficult to dig the pit to the proper depth without shoring up the earth walls of the pit. By making the catch basin in sections and installing one of the sections after the pit is partially dug the necessity for shoring up the earth wall of the basin may be avoided. It is also desirable that each section shall be short instead of long enough for the full depth of the basin, because the earth is of a caving nature and also because the earth grips the side of the catch basin. If the first short section 40 is lowered into place and properly secured to the floor or other supports after the basin has been dug deep enough to receive it, it acts as a form to prevent the dirt wall of the pit from gripping the lower section 41 when the latter is lowered into place after the pit is deepened to receive the second section which is of less diameter than the upper section.

When the lower section 41 has been lowered into place its upper end will extend somewhat above the lower end of the upper section 40 and the lapping portions may be secured together by any suitable means to form a tight joint or if the lapping portions are spaced apart a suitable packing or filling may be introduced between the lapping portions to make the joint tight. Preferably this is done by grouting or by riveting the two sections together as shown at 44. After the pit has been dug deep enough to receive the lowermost section it is dug a little deeper to allow the introduction of temporary supports 45 which may be in the form of timbers placed on the earth bottom of the pit to serve as temporary foundations for the lowermost section and then concrete 46 is poured into the catch basin to form a permanent hard and watertight bottom for the catch basin. The lowermost section 41 is seated upon the concrete base. A flange 48 is provided on the inner periphery of the lower section 41 and serves as a support for the lower end of the heat reclaimer shell A. The flange 48 also rests in an upright support 49.

One form of heat reclaimer adapted to be employed in connection with the catch basin comprises a hollow cylindrical shell 10, having tube sheets 11 and 12 at its upper and lower ends respectively, and tubes 13 extending through the shell and connected with the tube sheets, said tubes being open at each end to the interior of the catch basin.

The hot soil water from the catch basin will enter the tubes 13 at their upper ends, it being assumed that the hot soil water in the basin will be of sufficient depth so that the upper surface of the soil water will normally be above the tops of the tubes.

An inlet pipe 14 for the clean water which is to be heated enters the heat reclaimer shell A through an inlet aperture in the wall of the shell near the lower end thereof just above the lower tube sheet 12 and delivers clean water into said shell. The clean water thus introduced will circulate around the tubes and pass upward to the outlet 15 just below the upper tube sheet 11. The hot soil water enters the basin through pipe 36.

A soil water overflow pipe 23 opens at its lower end to the soil water in the lower part of the catch basin extends upward to a point above the top of the heat reclaimer shell and at its upper end has a chamber 25 into which the soil water passes from the overflow pipe, thence out through an outlet pipe 27.

I claim:

1. A catch basin for soil water comprising two tubular metallic sections both elliptical in cross section and vertically disposed in axial alinement with each other, the lower section being of less diameter throughout its height than the upper section, the upper end of the lower section extending a short distance into the interior of the upper section and making a joint therewith, a pit in the earth in which said tubular members are sunk and a watertight base for the lower section at the bottom of the pit, in combination with a cylindrical soil water heat reclaimer vertically disposed and enclosed within the said basin, means whereby clean water may pass into and out of said heat reclaimer and basin without mingling with the soil water, said heat reclaimer being of less height than the basin and of slightly less diameter than the shorter diameter of the basin and being positioned in one of the bays at one side of the center of said basin.

2. A catch basin for soil water comprising two tubular metallic sections both elliptical in cross section and vertically disposed in axial alinement with each other, the lower section being of less diameter throughout its height than the upper section, the upper end of the lower section extending a short distance into the interior of the upper section, a pit in the earth in which said tubular members are sunk and a base for the lower section at the bottom of the pit, in combination with a cylindrical soil water heat reclaimer vertically disposed and enclosed within the said basin, means whereby clean water may be admitted into and conducted from said heat reclaimer to a delivery place outside of the catch basin without mingling with the soil water, said heat reclaimer being of less height than the basin and of slightly less diameter than the shorter diameter of the basin and being positioned in one of the bays at one side of the center of said basin at some distance above the bottom and below the top of said basin.

3. A catch basin for soil water comprising two tubular metallic sections both elliptical in cross section and vertically disposed in axial alinement with each other, the lower section being of less diameter throughout its height than the upper section, the upper end of the lower section extending a short distance into the interior of the upper section, a pit in the earth in which said tubular members are sunk and a watertight base for the lower section at the bottom of the pit, in combination with a cylindrical soil water heat reclaimer vertically disposed and enclosed within the said basin and into which clean water may be admitted and out of which it may pass to a delivery point outside of the catch basin without mingling with the soil water, said heat reclaimer being of less height than the basin and of slightly less diameter than the shorter diameter of the basin and being positioned in one of the bays at one side of the center of said basin, means whereby hot soil water is admitted into said basin, and into contact with said heat reclaimer, and means whereby the soil water is discharged from said basin.

4. A catch basin for soil water, comprising two tubular metallic sections both elliptical in cross section and vertically disposed in axial alinement with each other, the lower section being of less diameter throughout its height than the upper section, the upper end of the lower section extending a short distance into the lower end of the upper section in combination with a cylindrical soil water heat reclaimer vertically disposed and enclosed within said catch basin, said heat reclaimer being of less diameter than the shorter diameter of the basin, and being positioned in one of the bays at one side of the center of said basin.

5. A catch basin for soil water, comprising two tubular metallic sections both elliptical in cross section and vertically disposed in axial alinement with each other, the lower section being of less diameter throughout its height than the upper section, the upper end of the lower section extending a short distance into the lower end of the upper section in combination with a cylindrical soil water heat reclaimer vertically disposed and enclosed within said catch basin, said heat reclaimer being of less diameter than the shorter diameter of the basin, and being positioned in one of the bays at one side of the center of said basin and means whereby clean water may be admitted into said heat reclaimer and conducted away therefrom to a delivery place outside of the catch basin without mingling with the soil water in the basin, said basin having an inlet and an outlet for the soil water.

6. A catch basin for soil water comprising two tubular metallic sections vertically disposed in axial alinement with each other, the lower section being of less diameter throughout its height than the upper section, the upper end of the lower section extending a short distance into the interior of the upper section and making a joint therewith, a pit in the earth in which said tubular members are sunk and a watertight base for the lower section at the bottom of the pit, in combination with a soil water heat reclaimer enclosed within the said basin, means whereby clean water may pass into and out of said heat reclaimer and basin without mingling with the soil water, said heat reclaimer being of less height and diameter than the basin and being positioned at one side of the center of said basin.

7. A catch basin for soil water comprising two tubular metallic sections vertically disposed in axial alinement with each other, the lower section being of less diameter throughout its height than the upper section, the upper end of the lower section extending a short distance into the interior of the upper section, a pit in the earth in which said tubular members are sunk and a base for the lower section at the bottom of the pit, in combination with a soil water heat reclaimer enclosed within the said basin, means whereby clean water may be admitted into and conducted from said heat reclaimer to a delivery place outside of the catch basin without mingling with the soil water, said heat reclaimer being of less height and diameter than the basin and being positioned at one side of the center of said basin at some distance above the bottom and below the top of said basin.

In testimony whereof I affix my signature.

FRED S. BOLTZ.